United States Patent Office 2,825,934
Patented Mar. 11, 1958

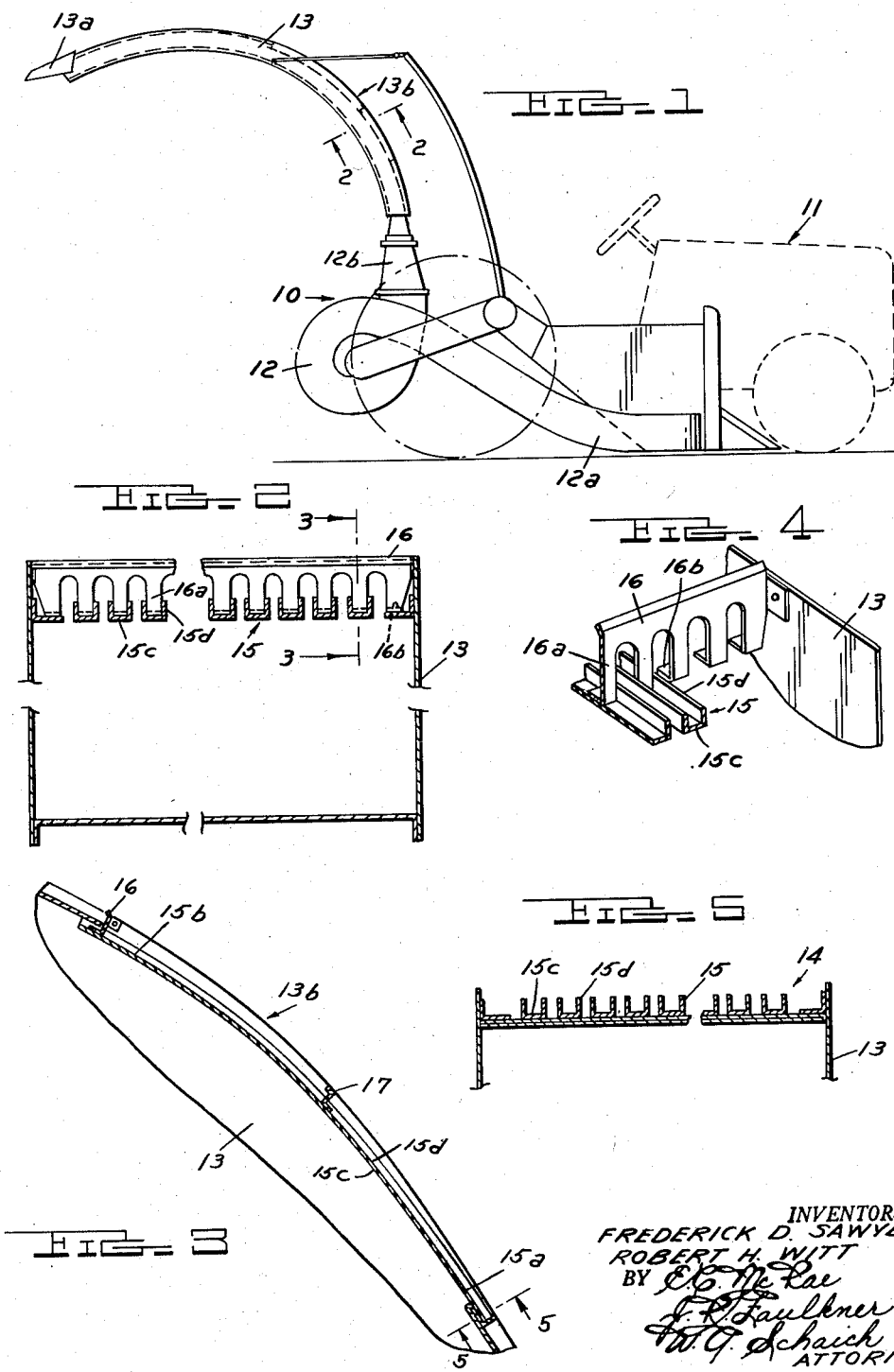

2,825,934

TRASH SEPARATION DEVICE FOR COTTON HARVESTERS

Frederick D. Sawyer, Birmingham, and Robert H. Witt, Royal Oak, Mich., assignors to Ford Motor Company, Dearborn, Mich., a corporation of Delaware Application September 30, 1953, Serial No. 383,168

3 Claims. (Cl. 19—76)

This invention relates to an improved trash separating device for cotton harvesters or the like.

In the mechanical harvesting of cotton, it has been common to convey the harvested cotton from the harvesting unit to a trailing wagon or a mounted receptacle by means of an air stream. Any mechanically harvested cotton, and particularly cotton harvested by the so-called stripping method, contains substantial quantities of trash, including pieces of stalks, leaves, weeds, and soil that has accumulated on the low lying cotton bolls. It obviously is desirable to separate as much of this trash from the cotton as is possible during the harvesting operation so as to minimize the amount of trash transported with the cotton to the gin.

Accordingly, it has been common to provide a curved portion in the air stream conduit and dispose a trash separating grill in an aperture formed in the convex side of the curved portion of the conduit. The slot like openings defined by such grill would be proportioned to permit the discharge therefrom of various types of trash but would resist the passage therethrough of the cotton. By virtue of the curved configuration of the conduit and the relatively greater density of the trash as compared with the cotton, a fair degree of centrifugal separation of the trash from the cotton would be produced and a substantial quantity of trash thus separated would be discharged through the grill. However, considerable difficulties have been heretofore encountered with such trash separating grills in that they tend to become rapidly clogged by the cotton lint and lock. The lint and lock would accumulate at the down stream ends of the grill slots and gradually build up in an up stream direction until the grill was completely closed. Hence, frequent interruptions to the cotton harvesting operation were required to effect the manual cleaning of the trash separating grills.

Accordingly, it is an object of this invention to provide an improved trash separating device for cotton harvesters or the like which is constructed in such a manner as to be substantially self-cleaning and anti-clogging.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is an outline elevational view of a well-known form of cotton harvester incorporating a trash separating grill constructed in accordance with the invention in the air stream conduit of such harvester.

Figure 2 is an enlarged square sectional view taken on the plane 2—2 of Figure 1.

Figure 3 is a sectional view taken on the plane 3—3 of Figure 2.

Figure 4 is a fragmentary perspective view illustrating the manner in which the down stream elements are supported within the air stream conduit.

Figure 5 is a sectional view taken on the plane 5—5 of Figure 3.

As shown on the drawings:

In Figure 1 is schematically illustrated a well-known form of cotton harvester unit 10 mounted upon a tractor 11, such harvester unit includes a conventional mechanism (not shown) for effecting the stripping of the bolls from the plants and further includes a blower 12 for elevating the harvested cotton bolls to a trailing wagon or any other suitable receptacle. Blower unit 12 includes an intake conduit 12a and a vertically directed discharge conduit 12b. Attached to such discharge unit 12b is a conveyor conduit 13 which is preferably curved so that the free end 13a of such conveyor conduit is disposed in a substantially horizontal plane. At any suitable point along the curved portion of the conveyor unit 13, an elongated trash discharge aperture 13b is formed in the outer curved wall of conduit 13. A grill structure 14 constructed in accordance with this invention is then mounted in the aperture 13b to permit the discharge of trash from the air stream but to resist the discharge of cotton. The grill structure 14 preferably comprises a series of substantially rigid parallel and equally spaced apart elongated stripping elements 15 which are curved lengthwise, to generally conform to the configuration of the conveyor conduit 13.

In accordance with this invention, the upstream ends 15a of the stripping elements 15 are mounted and secured to the exterior face of the outer curved wall of conduit 13, as best shown in Figure 3. In this manner no lint collecting shoulder is presented to the air stream, which would permit lint to collect and build up and clog the trash discharge grill. Furthermore, and more importantly, the down stream ends 15b of the elements 15 are supported in inwardly projected relationship with respect to the outer curved wall of the conveyor conduit 13. Here again, due to the special configuration of the strip elements 15 and the means for supporting the down stream ends of said strip elements, no trash collecting surfaces are disposed in the air stream.

As best shown in Figures 2, 4 and 5, each of the strip elements 15 is of channel shaped configuration, including a bight or web portion 15c and spaced upstanding arm portions 15d. At the up stream ends 15a, the web portions 15c of the strip elements are welded or otherwise rigidly secured to the exterior face of the conveyor conduit 13. The downstream ends 15b of strip elements 15 are supported by a spacer member 16 which is mounted at the down stream end of the discharge grill 13b in transverse relationship thereto, and is constructed with a generally comb-shaped configuration having equally spaced depending teeth portions 16a respectively aligned with and projecting into the channels defined between the arm portions 15d of the strip elements 15 and maintaining said strip elements in parallel relationship with each other. The extreme ends of the teeth 16a are bent perpendicular to form a mounting flange 16b which may be conveniently welded or otherwise secured to the web portion 15c of strip elements 15. If desired, for purposes of further rigidity, an intermediate strip spacer 17 may be provided which is constructed in the same general configuration as mounting strip 16 but has tooth portions 17a which are shorter in length then the corresponding portions 16a.

It should be noted that each of the grill strip elements 15 extends slightly beyond the support 16 in a downstream direction.

It is quite apparent that the aforedescribed construction provides a trash separating grill providing an absolute minimum of trash collecting surfaces within the conveyor conduit 13. Any lint that is temporarily trapped in the slot like openings between any two adjacent strip elements 15 will be gradually moved lengthwise along such strip elements either by the air forces thereon or the successive impacts of additional materials until it reaches the downstream ends of such strip elements, which are disposed beyond the support member 16. Hence a trash separating grill constructed in accordance with this invention provides a self-cleaning action which greatly minimizes any tendency of lint or trash to build up and impair the separating efficiency of the grill.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In an airstream type cotton conveyor, a conduit section of generally rectangular cross section longitudinally curved in a single plane, the outer curved wall of the curved section having an elongated aperture therein extending in the direction of airstream movement; and a closure for said aperture, comprising a series of substantially rigid, parallel, longitudinally extending strip elements extending for the full length of the aperture and spaced apart laterally to define a series of discharge slots of equal width proportioned to permit discharge of trash therethrough but to prevent discharge of cotton, the down stream ends of the strip elements being disposed inwardly of the conduit in overlapping relation to the outer curved wall at the down stream end of the aperture and the spaces between the strip elements adjacent their down stream ends being unobstructed, whereby material passing lengthwise of the conduit against the strip elements will pass freely from the down stream ends of the strip elements and through the conduit.

2. The combination defined in claim 1 wherein each of said strip elements constitutes a channel shaped member having arm portions connected by a web portion, each strip element being disposed with its said arm portions projecting outwardly, the up stream ends of said channel shaped members having said web portions abuttingly secured to the outside face of the outer curved wall at the upstream end of the aperture, and the down stream ends of said channel shaped members having their said arm portions abuttingly secured to the inside face of the outer curved wall at the downstream end of the aperture.

3. The combination defined in claim 2 plus a reinforcing member mounted on said conduit section in transverse relation to and intermediate the length of said elongated aperture, said reinforcing member having a plurality of equally laterally spaced tooth-like projections respectively insertable in and secured to the channel portion of said strip elements.

References Cited in the file of this patent
UNITED STATES PATENTS

| | | |
|---|---|---|
| 30,227 | Johnson | Oct. 2, 1860 |
| 891,191 | Shinn et al. | June 16, 1908 |
| 1,308,825 | Wegerer | July 8, 1919 |
| 2,668,330 | Gieszl | Feb. 9, 1954 |